UNITED STATES PATENT OFFICE.

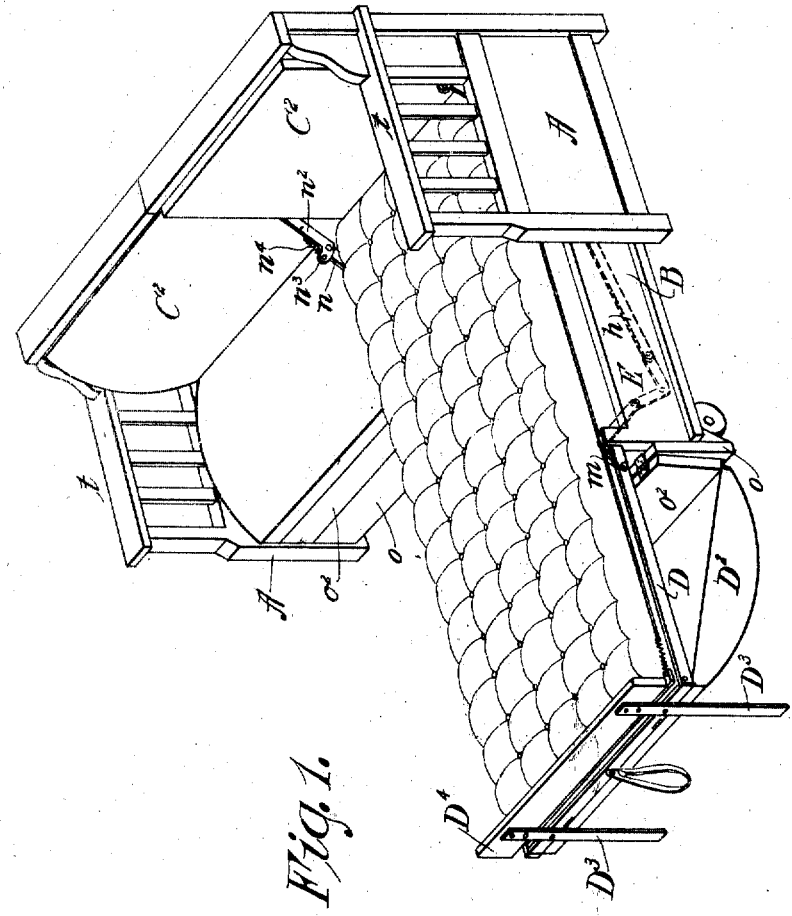

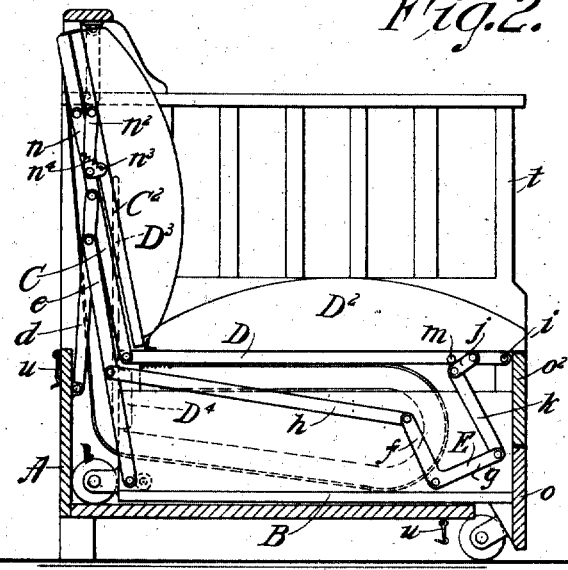
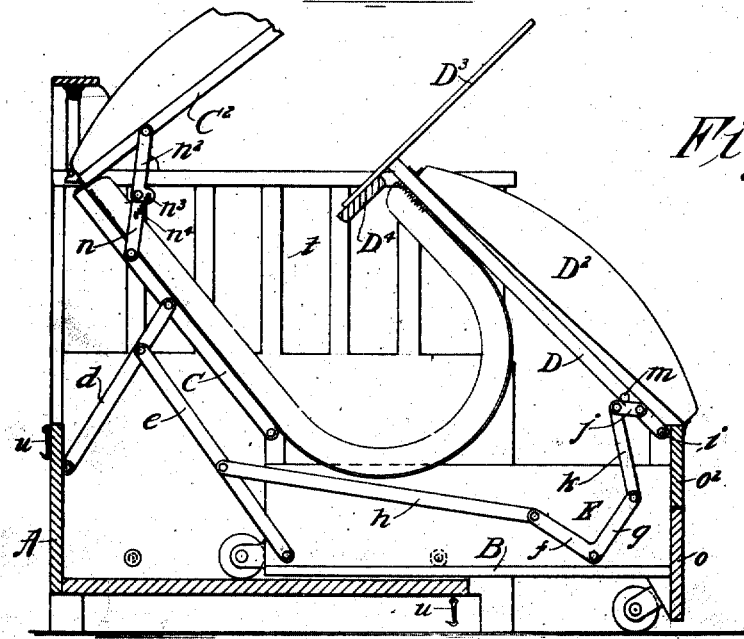

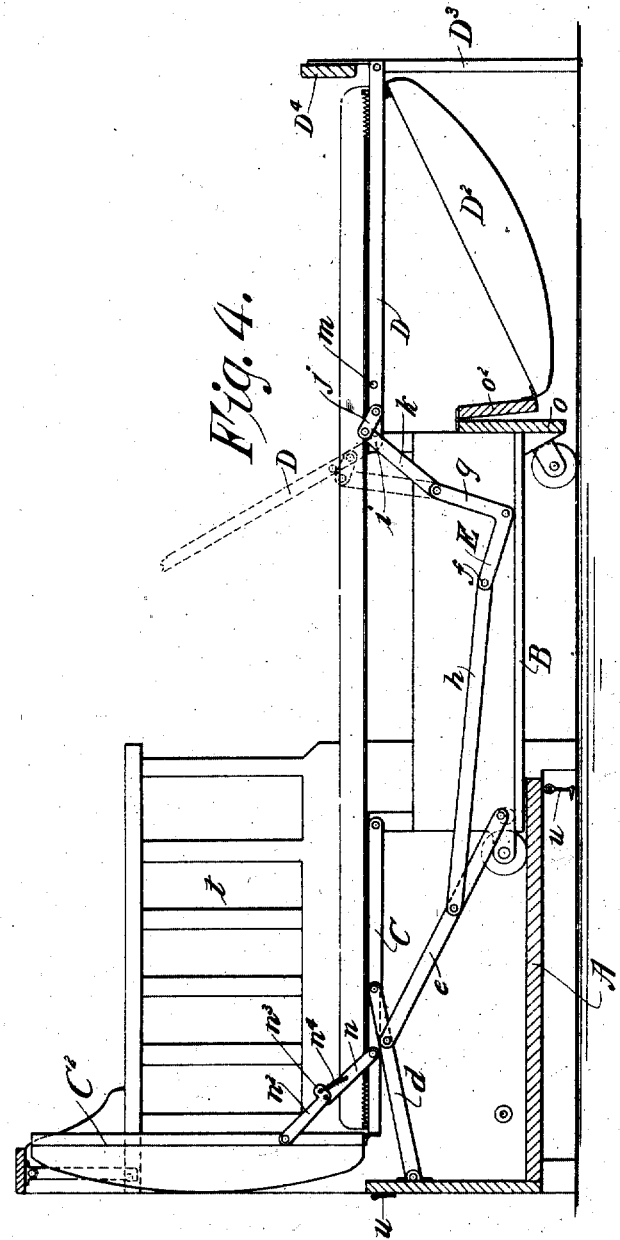

CHARLES F. PERCIVAL, OF SPRINGFIELD, MASSACHUSETTS.

CONVERTIBLE SEAT AND BED.

1,248,702. Specification of Letters Patent. Patented Dec. 4, 1917.

Application filed March 21, 1916. Serial No. 85,707.

*To all whom it may concern:*

Be it known that I, CHARLES F. PERCIVAL, a citizen of the United States of America, and resident of Springfield, in the county of Hampden and State of Massachusetts, have invented certain new and useful Improvements in Convertible Seats and Beds, of which the following is a full, clear, and exact description.

This invention relates to convertible seats, and beds, of a character comprising parts to constitute a main support or body, a seat, and a back, for a seat or couch, with interconnecting means whereby the parts may be constrained to have movements in relation to each other so that the seat or couch may be transformed to a bed, and thereafter restored to the condition and aspect of a seat, lounge or davenport.

An object of the present invention is to improve the arrangements of a main or body frame, an intermediate frame slidable in relation to the main frame, a seat frame, and a back forming frame, and the connections between one and another of the frames for the production of the convertible seat and bed which is of simplified character and susceptible of unusually easy and convenient operation for effecting the changes from seat to bed, and vice versa.

Another object is to provide a convertible couch bed which is so sectionally made, and adapted to be connected and disconnected, that the piece of furniture is available as a full length lounge, divan or davenport; as two separate chairs or seats; as a half width bed, with a seat at the side of the head portion of such half width bed,—or with a seat disconnected and removed from the half width bed; as a full width bed; or as half width or twin beds, capable of being separated one from another by as little or great a distance as may be desired.

And further objects of the invention are attained in and by the organization of the parts and devices as hereinafter rendered manifest.

The present invention is described in conjunction with the accompanying drawings and is set forth in the claims.

In the drawings:—

Figure 1 is a perspective view showing the couch, lounge or davenport, sectionally made, one of the sections thereof being in its compacted or seat forming condition, while the other is opened out and extended to form a half width bed.

Fig. 2 is a sectional elevation through one of the sections or halves of the convertible couch bed, the parts being in their compacted and seat forming relations.

Fig. 3 is a view similar to Fig. 2, but showing the relatively movable parts as in their partially opened and extended relations.

Fig. 4 is a similar sectional elevation but showing the parts as in their fully opened and extended relation to form a bed.

Referring to the drawings, A represents a main or body frame, of a low box-like form, both open upwardly and open at its front.

For the convertible couch and bed, this body frame is made of half the width of a full width bed, which dimension is one corresponding to a half length of the couch or divan; and a pair of such body frames and of all of the parts to form half width beds, or seats or chairs having widths which are equal to half the length of the lounge, which are directly or indirectly connected to each of the main frames are employed in a manner to be attachable and disconnectible for the purposes of this invention.

B represents the intermediate frame, so termed for the reason that when slid out from the main frame it has its position intermediately between the head and foot portions of the bed.

The combination and arrangement of the main and intermediate frames are substantially the same as comprised in the convertible seat and bed forming the subject matter of Letters Patent of the United States issued to me June 8, 1909, No. 924,374, as well also in a general way as are the relative combinations and arrangements with the main and intermediate frames of the back and seat forming frames.

The back frame C is hinged at its lower edge to a rear upper portion of the intermediate frame, and has a supplemental frame $C^2$ (upholstered), normally lying facewise adjacent and forward thereof and hinged to its upper edge.

D represents the seat frame proper, hinged to a forward portion of the intermediate frame, and adapted normally to be superimposed thereupon and also to be forwardly overturned, the same having leg members D³ and a member D⁴ to form a foot board for the bed.

Said members D³ and D⁴ are rigidly connected to the seat frame, and when the parts are in the compacted seat-forming relations the leg member D³ has an upstanding position at the back of the chair or couch above the level of the seat frame while the foot board member has a depending position below such level.

$d$ represents a link connected to a rear portion of the main frame A, and to an intermediate portion of the back frame C.

$e$ represents another link connected to a rear portion of the intermediate frame B, and to an intermediate portion of the link $d$.

E represents an angular lever pivotally connected to a forward portion of the intermediate frame, the rear arm $f$ of such lever being upwardly and rearwardly extended from the pivoted elbow, while the forward arm $g$ of the lever is extended from the elbow with an upward and forward inclination.

A more or less nearly horizontal link $h$ connects the upper end of the rear arm of the angular lever with an intermediate portion of the said link $e$.

A linkage is provided between the upper end of the forward arm of the elbow lever E and the seat frame D adjacent the pivotal connection or hinge $i$ which forms the joint or articulation of the seat frame to the upper forward portion of the intermediate frame B,—the connection of such linkage with the seat frame being to the rear of the pivot $i$ as the parts are seen when in the relation shown in Fig. 2.

Such linkage consists of a short link $j$ normally downwardly and rearwardly inclined, as per Fig. 2, and a longer link $k$ pivoted to the link $j$ and having the lower end thereof pivoted to the angular lever arm $g$.

This linkage constituted by the pivotally connected members $j$ and $k$ constitute in substance a toggle.

The seat frame has at a suitable distance to the rear of its pivoted forward edge a member, formed as a laterally projecting stud $m$ to edgewise engage the seat frame link $j$ at times when the seat frame is in its normal superimposed position on the supplemental frame, and also when the seat frame is swung from such position to an upward and rearward inclination approaching a vertical position, see Fig. 3 and the dotted line indication of the seat frame D in Fig. 4.

The weight of the seat frame and the supplemental upholstery carrying frame D² imposes a stress when the seat frame is in the upward and rearward inclination above referred to, and in any position between such inclination and its horizontal superimposed position against the said abutment stud for exertion through the above described system of lever arms and links to cause, as may be additionally assisted by manual power, the folding up and moving to compacted relations of the seat and bed forming frames.

To overturn and open the parts from the relative positions of Fig. 2, the main and supplemental seat frames D and D² are swung up to about the relations shown in Fig. 3, and then continued to the overturned position shown in Fig. 4.

The normally rearwardly inclined back frame C and its supplemental frame C² exerts a force in a downward direction against the upwardly and forwardly inclined link $d$ to swing the latter forwardly and downwardly.

This has the effect, through the link $e$ to impart a thrust in a forward direction to the link $h$ which is connected to the angular lever E and to cause the intermediate frame on which the lever is mounted to be slid in its forwardly distending direction.

The relief of the counter force against the link and lever system, when the seat frame is overturned from the position of Fig. 3 to that of Fig. 4, and by reason of the stud $m$ moving away from engagement with the link $g$, leaves the completion of the movements of the intermediate frame and back frame free to be automatically gravitatively performed,—without regard to any manual restraining or assisting force,—the weight of the back frame C and the supplemental back frame C² being the operative factor.

Therefore, the back frame which had normally been in a position slightly rearwardly inclined from the vertical will assume a laid out horizontal position and the supplemental back frame hinged thereto may be swung up to an approximately vertical position, and for the time of the use of the parts as a bed, held in such position by the confining means provided therefor, the same, as shown, comprising a foldable brace consisting of two bars $n$ and $n^2$ pivoted together at their inner ends, and at their outer ends pivoted to the supplemental back frame C² and to the back frame proper C.

One of the link-like parts or sections has a short arm $n^3$ angularly extending from adjacent the two part connecting pivot and has a spring $n^4$, by its one end connected to such arm and by its other end to the other member of the brace,—the effect of such spring being to hold the brace members $n$ and $n^2$ in, or substantially in, their straightened brace forming relations.

This brace, however, as manifest, is foldable as occasion therefore requires, as seen in Fig. 2.

When the opened out bed, Fig. 4, is to be made to resume the seat formation, Fig. 2, and the seat frame in returning is brought to partially rearwardly overturned position, as represented in Fig. 3, the stud or abutment $m$ thereon engages and downwardly forces the pivotally connected links which form the jointed toggle-like connection between the seat frame and the forwardly and upwardly extended arm of the angular lever.

This effects a downswinging of the forward arm of the angular lever and an upward and forward swinging of the rearward arm of such lever, causing a relatively pulling force on the link $h$ which rearwardly extends from and is connected to the rear arm of the angular lever.

This force resisted by the links $e$ and $d$ and the parts to which they are jointed, causes a swinging toward the vertical position of the link $e$ connected to the rear portion of the intermediate frame, and as such link is connected to the link connecting the back frame and main frame, the intermediate frame connecting link is constrained to move rearwardly to its nested position relatively to the main frame.

The swinging action toward upright position of the said intermediate frame-connecting link $e$ causes also a forcing toward vertical position of the link between and connected to the back of the main frame and the seat frame, whereby the latter is made to assume its approximately upright position.

The weight of the main seat frame and the hinged supplemental seat frame as well as the weight of the supplemental back section, more or less imposed on the rear of the supplemental seat section is effective to hold the parts in their normal seat or couch forming relations; and additional weight, as that of a person sitting or reclining on the couch increases the certainty of retention of all of the parts in their seat forming relations.

The intermediate frame B at its front is made with a transverse board $o$ extending upwardly but part way of the height of the front of such frame, and to this is a hinged front board section $o^2$ adapted to be swung down from the position Fig. 2 to that of Fig. 4.

The supplemental seat section $D^2$ is hinge connected at its rear edge to a rear portion of the seat frame proper and at its forward edge to the said hinged front section $o^2$, this jointing being such that when the seat frame proper is overturned to its extended horizontal position to form the support for the foot portion of the bed, the supplemental seat frame automatically assumes a downwardly and forwardly inclined position and the hinged front section an almost entirely overturned position as represented in Figs. 1 and 4.

As here shown and hereinbefore indicated, the body frame, intermediate frame, and seat and back frames with their supplemental frames are constructed of dimensions corresponding to half the length of the couch or divan and to that of a half width bed; and the duplicated main frames have each a single outer side arm-like member $t$, one being a "right" and the other a "left."

The sectionally made parts are to be united to form a single convertible divan and full width bed, or to have the sections separated one from the other.

A hasp or hasps $u$ on the back and bottom of the one body or main frame may engage in a staple or over a stud on the adjoined main frame of the other section.

It is readily conceivable that this article is available as a full length lounge, divan or davenport; as two separate and independently movable chairs or seats; as a half width bed with a seat at the side of the head portion thereof; or with a seat disconnected and removed from the half width bed; as a full width bed, as an entirety; or as half width, or twin beds, capable of being separated one from another by as little or great a distance as may be desired.

The intermediate frame B is cut down or left open at is sides below its top to leave at the middle of the bed a free open space to permit the downward deflection of the mattress and mattress supporting fabric thereat as conducive to the comfort of the user.

The mattress supporting fabric and the mattress are arranged and disposed both when the parts are opened, and folded, in substantially the manner described in my aforementioned Letters Patent.

I claim:—

1. In a convertible seat and bed, a main or body frame, an intermediate frame,—slidable and adapted to be nested in relation to the main frame and to be forwardly distended relatively thereto,—a back frame, hinged at its lower edge to a rear upper portion of the intermediate frame, a seat portion of the intermediate frame, adapted normally to be superimposed thereon, and to be forwardly overturned, a link connected to a rear portion of the main frame and to an intermediate portion of the back frame, a link pivotally connected to a rear portion of the intermediate frame and to an intermediate portion of the first named link, an angular lever pivotally connected to a forward portion of the intermediate frame, the rear portion of which is link connected to the second named link, a linkage in pivotal connection between the seat frame and the forward arm of the angular lever, and a member on the seat frame, operable to engage said linkage when the seat frame is being swung toward its superimposed position on the intermediate frame and to constrain the link and lever connected parts to assume their compacted seat forming relations.

2. In a convertible seat and bed, a main or body frame, an intermediate frame slidable, and adapted to be nested in relation to the main frame and to be forwardly distended relatively thereto, a back frame hinged at its lower edge to a rear upper portion of the intermediate frame, a seat frame hinged to a farward portion of the intermediate frame adapted normally to be superimposed thereon, and to be farwardly overturned, a link connected to a rear portion of the main frame and to an intermediate portion of the back frame, a link pivotally connected to a rear portion of the intermediate frame and to an intermediate portion of the first named link, an angular lever pivotally connected to a forward portion of the intermediate frame, the rear arm of which is link-connected to the second named link, a link, pivotally connected to a forward portion of the seat frame, a link connecting the seat frame link and the forward arm of the angular lever, and a stud projecting laterally from the seat frame, operable to engage the seat frame link when the seat frame is being swung toward its superimposed position on the intermediate frame and to constrain the link and lever connected parts to have their compacted seat forming relations.

3. In a convertible seat and bed, a main or body frame, an intermediate frame,— slidable in relation to the main frame, a back frame hinged at its lower edge to a rear upper portion of the intermediate frame, a supplemental back frame hinged to the upper edge of the main back frame, and means for temporarily holding said supplemental frame approximately right angular to the back frame proper, a seat frame hinged to a forward portion of the intermediate frame, adapted normally to be superimposed thereon, and to be forwardly overturned, a link connected to a rear portion of the main frame and to an intermediate portion of the back frame, a link pivotally connected to a rear portion of the intermediate frame and to an intermediate portion of the first named link, an angular lever pivotally connected to a forward portion of the intermediate frame, the rear arm of which is link-connected to the second named link, a linkage in pivotal connection between the seat frame and the forward arm of the angular lever, and a member on the seat frame, operable to engage said linkage when the seat frame is being swung toward its superimposed position on the intermediate frame.

4. In a convertible seat and bed, a main or body frame, an intermediate frame,— slidable relatively to the main frame,—having at its front a lower fixed section, and an upper section hinged to the lower section, a back frame hinged at its lower edge to a rear upper portion of the intermediate frame, a seat frame hinged to a forward portion of the intermediate frame, adapted normally to be superimposed thereon, and to be forwardly overturned, a supplemental seat section having its rear edge hinged to the rear portion of the seat frame, proper, and having its forward edge hinged to said upper section at the front of the intermediate frame, a link connected to a rear portion of the main frame and to an intermediate portion of the back frame, a link pivotally connected to a rear portion of the intermediate frame and to an intermediate portion of the first named link, an angular lever pivotally connected to a forward portion of the intermediate frame, the rear arm of which is link-connected to the second named link, a linkage pivotally connected between the seat frame and the forward arm of the angular lever, and a member on the seat frame, proper, operable to engage said linkage when such frame is being swung toward its superimposed position on the intermediate frame and to force the link and lever connected parts into their compacted seat forming relations.

5. In a convertible seat and bed, a main or body frame, an intermediate frame,— slidable relatively to the main frame,—having at its front a lower fixed section, and an upper section hinged to the lower section, a back frame hinged at its lower edge to a rear upper portion of the intermediate frame, a supplemental back frame hinged to the upper edge of the main back frame, and means for temporarily holding said supplemental frame approximately right angular to the back frame proper, a seat frame hinged to a forward portion of the intermediate frame, adapted normally to be superimposed thereon, and to be forwardly overturned, a supplemental seat section having its rear edge hinged to the rear portion of the seat frame, proper, and having its forward edge hinged to said upper section at the front of the intermediate frame, a link connected to a rear portion of the main frame and to an intermediate portion of the back frame, a link pivotally connected to a rear portion of the intermediate frame and to an intermediate portion of the first named link, an angular lever pivotally connected to a forward portion of the intermediate frame, the rear arm of which is link-connected to the second named link, a linkage in pivotal connection between the seat frame and the forward arm of the angular lever, and a member on the seat frame, proper, operable to engage said linkage when such frame is being swung toward its superimposed position on the intermediate frame and to force the link and lever connected parts into their compacted seat forming relations.

6. In a convertible seat and bed, a main or body frame, an intermediate frame,—slidable and adapted to be nested in relation to the main frame and to be forwardly distended relatively thereto,—a back frame hinged at its lower edge to a rear upper portion of the intermediate frame, and normally extended upwardly and rearwardly inclined from its hinge connection, a seat frame hinged to a forward portion of the intermediate frame, adapted normally to be superimposed thereon, and to be forwardly overturned, and having at its rear edge opposite its pivot a rigid right angularly upwardly extended member to form a leg, and a narrow rigid downwardly extending member to form a foot board, a link connected to a rear portion of the main frame and to an intermediate portion of the back frame, a link pivotally connected to a rear portion of the intermediate frame and to an intermediate portion of the first named link, an angular lever pivotally connected to a forward portion of the seat frame, the rear arm of which is link-connected to the second named link, a linkage in pivotal connection between the seat frame and the forward arm of the angular lever, and a member on the seat frame, operable to engage said linkage when the seat frame is being swung from its forward open toward its superimposed position on the intermediate frame, and a supplemental frame pivoted to the upper edge of the back frame, adapted to be swung from facewise to angular relation thereto, and to constitute a head board, and means for temporarily rigidly holding such supplemental frame in its angular relation to the back frame proper.

Signed by me at Springfield, Mass., in presence of two subscribing witnesses.

CHARLES F. PERCIVAL.

Witnesses:
G. R. DRISCOLL,
H. G. VALENTINE.